(12) United States Patent
Medalsy

(10) Patent No.: US 11,597,140 B2
(45) Date of Patent: Mar. 7, 2023

(54) APPARATUS FOR PHOTO-CURING PHOTO-SENSITIVE MATERIALS FOR THE FORMATION OF THREE-DIMENSIONAL OBJECTS USING EXTRACTION PLATE WITH CONTINUOUS MOTION

(71) Applicant: NEXA3D INC., Ventura, CA (US)

(72) Inventor: Izhar Medalsy, Ventura, CA (US)

(73) Assignee: NEXA3D INC., Ventura, CA (US)

( * ) Notice: Subject to any disclaimer, the term of this patent is extended or adjusted under 35 U.S.C. 154(b) by 139 days.

(21) Appl. No.: 17/249,498

(22) Filed: Mar. 3, 2021

(65) Prior Publication Data

US 2021/0187827 A1 Jun. 24, 2021

Related U.S. Application Data

(62) Division of application No. 15/926,105, filed on Mar. 20, 2018, now Pat. No. 10,987,859.

(51) Int. Cl.
*B29C 64/129* (2017.01)
*B29C 64/232* (2017.01)
*B29C 64/264* (2017.01)
*B33Y 30/00* (2015.01)
*B33Y 10/00* (2015.01)

(52) U.S. Cl.
CPC .......... *B29C 64/129* (2017.08); *B29C 64/232* (2017.08); *B29C 64/264* (2017.08); *B33Y 10/00* (2014.12); *B33Y 30/00* (2014.12)

(58) Field of Classification Search
CPC ... B29C 64/129; B29C 64/232; B29C 64/264; B33Y 10/00; B33Y 30/00
See application file for complete search history.

(56) References Cited

U.S. PATENT DOCUMENTS

| | | |
|---|---|---|
| 9,511,546 B2 | 12/2016 | Chen et al. |
| 2016/0332378 A1 | 11/2016 | Page et al. |
| 2017/0252806 A1 | 9/2017 | Wienberg |
| 2018/0333911 A1 | 11/2018 | Lin et al. |
| 2019/0193332 A1 | 6/2019 | Schmale |
| 2020/0130262 A1 | 4/2020 | Theodet |

(Continued)

OTHER PUBLICATIONS

Notice of Allowance dated Dec. 18, 2020, for U.S. Appl. No. 15/926,105, filed Mar. 20, 2018, 9 pgs.

(Continued)

*Primary Examiner* — Michael M. Robinson
*Assistant Examiner* — Victoria Bartlett
(74) *Attorney, Agent, or Firm* — Ascenda Law Group, PC (57) ABSTRACT

Methods and apparatus for forming three-dimensional objects by photo-curing a photo-curing liquid polymer exposed to a radiation in a space between a base transparent to the radiation and a supporting plate. The supporting plate moves progressively, in some cases continuously, away from said transparent base during the printing process, and that movement is characterized in that it is tilting, swinging, rotating, and/or swirling in three-dimensional space, based on the print geometry, in order to expedite printing speed and resin propagation throughout the build area. In one embodiment, the movement may resemble a spiral or helical path from the standpoint of points around its circumference.

5 Claims, 14 Drawing Sheets

(56) References Cited

U.S. PATENT DOCUMENTS

2020/0324466 A1* 10/2020 Nishida ................. B33Y 30/00

OTHER PUBLICATIONS

Amendment filed Nov. 30, 2020, for U.S. Appl. No. 15/926,105, filed Mar. 20, 2018, 7 pgs.
Final Office Action dated Sep. 30, 2020, for U.S. Appl. No. 15/926,105, filed Mar. 20, 2018, 11 pgs.
Amendment filed Aug. 17, 2020, for U.S. Appl. No. 15/926,105, filed Mar. 20, 2018, 8 pgs.
Non-Final Office Action dated May 27, 2020, for U.S. Appl. No. 15/926,105, filed Mar. 20, 2018, 11 pgs.

* cited by examiner

APPARATUS FOR PHOTO-CURING PHOTO-SENSITIVE MATERIALS FOR THE FORMATION OF THREE-DIMENSIONAL OBJECTS USING EXTRACTION PLATE WITH CONTINUOUS MOTION

RELATED APPLICATIONS

This application is a Divisional Application of U.S. application Ser. No. 15/926,105, (now issued as U.S. Pat. No. 10,987,859), filed on 20 Mar. 2018, incorporated by reference herein.

FIELD OF THE INVENTION

The present invention relates to the field of three-dimensional printing, commonly referred to as 3D printing, and in particular to 3D printing by means of photo-curing photo-sensitive materials in a tank for the formation of three-dimensional objects.

BACKGROUND

Within the field of 3D printing technology the formation of three-dimensional objects through photo-curing of photo-sensitive materials comprises two basic technologies: stereolithographic ("SLA") printing, in which a laser emitting around 400 nm is used to solidify, by means of the beam emitted, a liquid, photo-curing polymer which is in a special tank; and digital light processing ("DLP") printing, according to which a photo-curing polymer, again in a liquid state in a tank, is exposed to luminous radiation emitted by a device similar to a projector. According to both these technologies, the printing process proceeds in a bottom-up style by making one layer after another; that is, solidifying a first layer adhering to a supporting plate (or extraction plate), raising the extraction plate by a specified amount, then solidifying a second layer so that it adheres to the first layer, and so on, until formation of the entire object is complete. Therefore, according to this technology, data representing the three-dimensional object to be formed is organised as a series two-dimensional layers which represent transversal sections of the object, and that data is used as a mask for the light source to form each transverse section (i.e., each layer) of the object in succession by photo-curing of the liquid polymer.

As each layer of the object under construction is printed, the extraction plate is raised in a tilting movement. Generally, such extraction plates consist of a material which facilitates the gluing on itself of the first layer of photo-cured polymer. In brief, the extraction plate moves to a predetermined distance from where the first layer of the object will be formed in the tank of photo-sensitive material (the so-called "resin") and waits for the light beam (SLA or DLP) to solidify the first layer. It then raises by a distance sufficient for the layer just formed to detach from the base of the tank (usually 50-500 μm) and then lowers by the same distance, less the predetermined distance for the formation of the second layer. This process continues until the entire object is formed. The resulting to and fro movement, known as the tilting movement, has two main purposes: it allows the layer just formed to detach from the base of the tank, and at the same time it allows a new quantity of liquid resin not polymerised to interpose between the layer just formed and the base of the container, thus refreshing material still in the liquid state beneath the layer already solidified for the curing and formation of the next layer. The tilting movement has an associated time, which must take into account the time for the extraction plate to rise and lower and for the renewal or refreshing of the very viscous resin in the printing region.

In order to reduce the risk of tearing newly formed layers as they are curing, the printing process proceeds in such a way that the surface of the extraction plate and of the objects being created are sufficiently small (usually on the order of 4×4-5×5 centimetres), and the raising speed of the extraction plate during the tilting step is sufficiently slow so that the newly formed layers are not exposed to substantial stresses. This means that production of the overall three-dimensional object proceeds very slowly, often on the order of hours per centimetre.

DETAILED DESCRIPTION

In embodiments of the present invention, a method for forming three-dimensional objects by photo-curing a photo-curing liquid polymer exposed to a radiation, wherein said three-dimensional objects form by growth, due to the progressive curing of said photo-curing liquid polymer, in a space between a base transparent to the radiation and a supporting plate, that is, a portion already formed of said objects, is provided. In accordance with the invention, the supporting plate moves progressively, in some cases continuously, away from said transparent base during the printing process, and that movement is characterized in that it is tilting, swinging, rotating, and/or swirling in three-dimensional space, based on the print geometry, in order to expedite printing speed and resin propagation throughout the build area. In one embodiment, the movement may resemble a spiral or helical path from the standpoint of points around its circumference.

A further embodiment of this invention relates to an apparatus for forming three-dimensional objects by photo-curing a photo-curing liquid polymer through exposure to a radiation, said apparatus being of the type including a tank for collecting said photo-curing liquid polymer, the base of the tank having a hole covered by a material transparent to said radiation, and a supporting plate designed to move away from the base of the tank. As indicated above, the apparatus is characterized in that the supporting plate is controlled so as to move progressively, in some cases continuously, away from the base of the tank during the printing process in a tilting, swinging, rotating, and/or swirling manner. In one embodiment, the movement may be in a spiral or helical path from the standpoint of points around the circumference of the supporting plate.

The photo-curing liquid polymers used for 3D printing of the kind described herein are very viscous. Thus, in conventional 3D printers of the SLA and DLP types, the overall speed of the printing process is affected by the time taken for the polymer to be refreshed in an area where a layer of an object has just been printed. The present invention substantially reduces that time by printing only a portion of a layer at a time, and displacing the extraction plate vertically, with respect to the base of the tank, in a tilting, swinging, rotating, and/or swirling fashion, and in one embodiment in a spiral or helical fashion, so that the area undergoing printing at any one time remains small and an immediately preceding area in which a portion of the object has been printed is allowed to be refreshed as the extraction plate is raised. Thus, while one area of the object is being printed, portions the extraction plate over other areas of the object that have just been printed are raised.

The motion of the extraction plate is controllable not only in direction, but also in amplitude and frequency, each along multiple dimensions. For example, as discussed below, a hexapod may be used to displace the extraction plate in any or all of six dimensions at a time, allowing for complex paths to be traced by the extraction plate, and, hence, the layer of the object being printed, in three-dimensional space. In other embodiments, piezo actuators positioned at various locations on an extraction plate assembly may be used to displace the extraction plate in any or all of multiple dimensions at a time. The frequencies of movement also may be varied, for example, to allow for different polymer refresh times. Low frequency, high amplitude movements of the extraction plate impart relatively low stresses to the object being fabricated and, therefore, are less likely to cause separation of the object from the extraction plate. High frequency, low amplitude movements of the extraction plate, on the other hand, may induce rapid refreshing of the liquid polymer to the build area, but may also impart relatively high stresses to the object being fabricated. Therefore, such movements may be best used only for short periods of time to induce polymer flow.

By allowing the extraction plate to move in the above-described fashions, there is a continuous process of printing and polymer refreshing within the build area taking place so that the overall printing speed is increased from that which might otherwise be the case. In some instances, the data used to print the object under construction will need to be formatted to account for this printing technique so that, instead of "flat" layers associated with a conventional tilting motion of the extraction plate following the printing of a layer, the printing data conforms to the continuous printing process afforded by the invention.

Figure 1A:
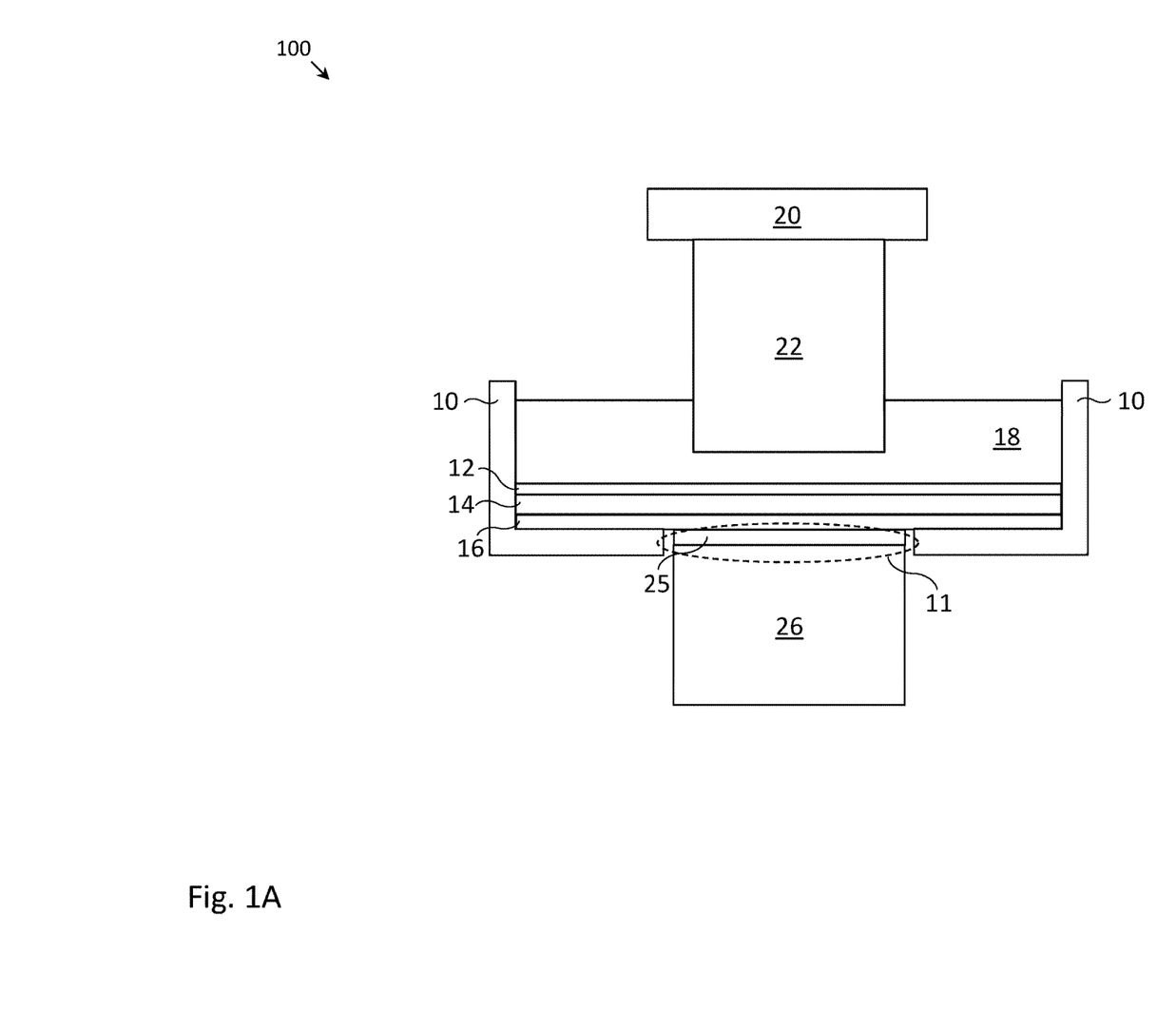
FIG. 1A depicts a cross-section of a 3D printing system in which electromagnetic radiation (e.g., ultra-violet light) is used to cure photo-curing liquid polymer in order to fabricate an object.

FIG. 1A depicts a cross-section of a 3D printing system 100, in which electromagnetic radiation (e.g., ultra-violet light) is used to cure photo-curing liquid polymer 18 in order to fabricate object 22 (e.g., a 3D object). Object 22 may be fabricated layer by layer; i.e., a new layer of object 22 may be formed by photo-curing a layer of liquid polymer 18 adjacent to the bottom surface of object; the object may be raised by extractor plate 20, allowing a new layer of photo-curing liquid polymer 18 to be drawn under the newly formed layer; and the process may be repeated to form additional layers.

The 3D printing system 100 may include tank 10 for containing the photo-curing liquid polymer 18. The bottom of tank 10 may include tank opening 11 to allow electromagnetic radiation from light source 26 to enter into tank 10. A radiation-transparent backing member 16 may be used to seal the tank opening 11 (i.e., to prevent the photo-curing liquid polymer 18 from leaking out of tank 10), while at the same time, allowing electromagnetic radiation to enter into tank 10 in order to cure the liquid polymer. In one embodiment, backing member 16 may be made from borosilicate glass. A mask 25 (e.g., a liquid crystal layer) may be disposed between light source 26 and the photo-curing liquid polymer 18 to allow the selective curing of the liquid polymer (which allows the formation of 3D object with intricate shapes/patterns). In various embodiments, collimation and diffusion elements such as lenses, reflectors, filters, and/or films may be positioned between mask 25 and light source 26. These elements are not shown in the illustrations so as not to unnecessarily obscure the drawings.

One challenge faced by 3D printing systems is that in addition to adhering to the object, the newly formed layer has a tendency for adhering to the bottom of tank, which is not desired, as the newly formed layer could tear off from the object when the object is raised. To address this issue, a flexible membrane 14 (also called a self-lubricating membrane) may be disposed adjacent to (though not necessarily touching) backing member 16. In some embodiments, flexible membrane 14 may be formed using a self-lubricating polymer that gradually releases a layer of liquid lubricant 12 onto the surface of flexible membrane 14 over time. The lubricant layer 12 may reduce the likelihood for the newly formed layer to adhere to the membrane 14. The flexible membrane may be formed using silicone and the liquid lubricant may include silicone oil. Either or both of the liquid lubricant and the flexible membrane may be enriched with polytetrafluoroethylene (PTFE) to further increase the "non-stick" quality of flexible membrane 14 and/or lubricant layer 12. Both the flexible membrane 14 and the liquid lubricant 12 are also radiation-transparent (at the wavelengths of interest) so as to allow electromagnetic radiation from light source 26 to enter into tank 10 in order to cure the liquid polymer. The use of such a flexible membrane 14 with a self-lubricating polymer is optional and, in other embodiments, the membrane may be formed of a different material or even omitted altogether (e.g. where the surface of the backing member 16 is itself a flexible membrane or flexible surface).

Figure 1B:
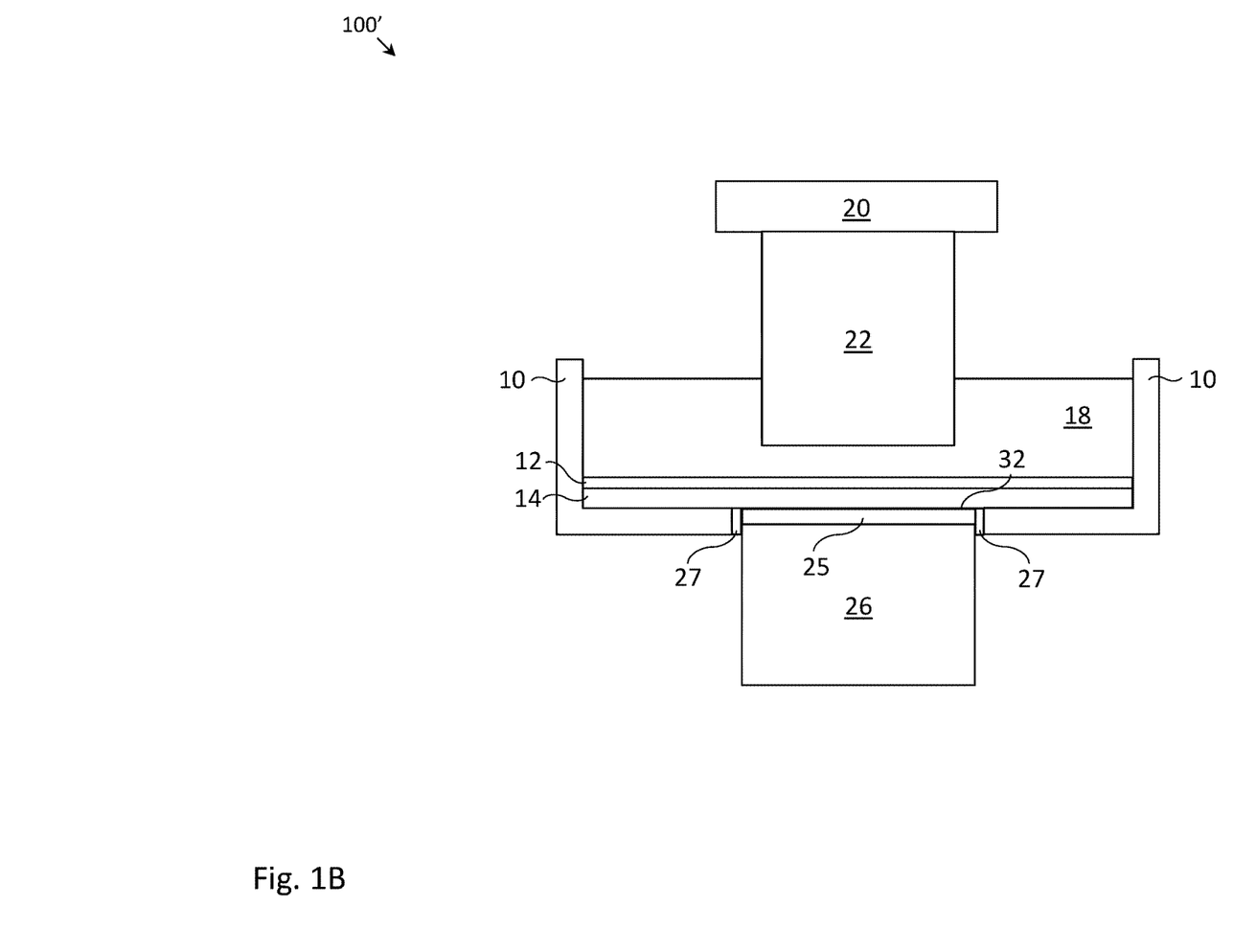
FIG. 1B depicts an alternative embodiment of a 3D printing system, similar to the 3D printing system illustrated in FIG. 1A except it does not include a backing member.

An alternative embodiment of a 3D printing system 100' is shown in FIG. 1B. 3D printing system 100' is similar to 3D printing system 100, except it does not include backing member 16. Instead, rather than using backing member 16 to seal tank opening 11, mask 25 is placed within the tank opening directly. To ensure that no leaking of the photo-curing liquid polymer 18 occurs, seal 27 (e.g., rubber gasket, caulking, etc.) may be disposed between mask 25 and tank 10. Flexible membrane 14 may be disposed directly over (but not necessarily touching) the bottom of tank 10 and the top surface of mask 25. In the remainder of this description, reference will be made to an embodiment that includes a backing member 16, but it should be recognized that the use of such a backing member is optional and the following description applies equally to embodiments which omit the backing member in favor of an arrangement such as that illustrated in FIG. 1B.

Figure 2A:
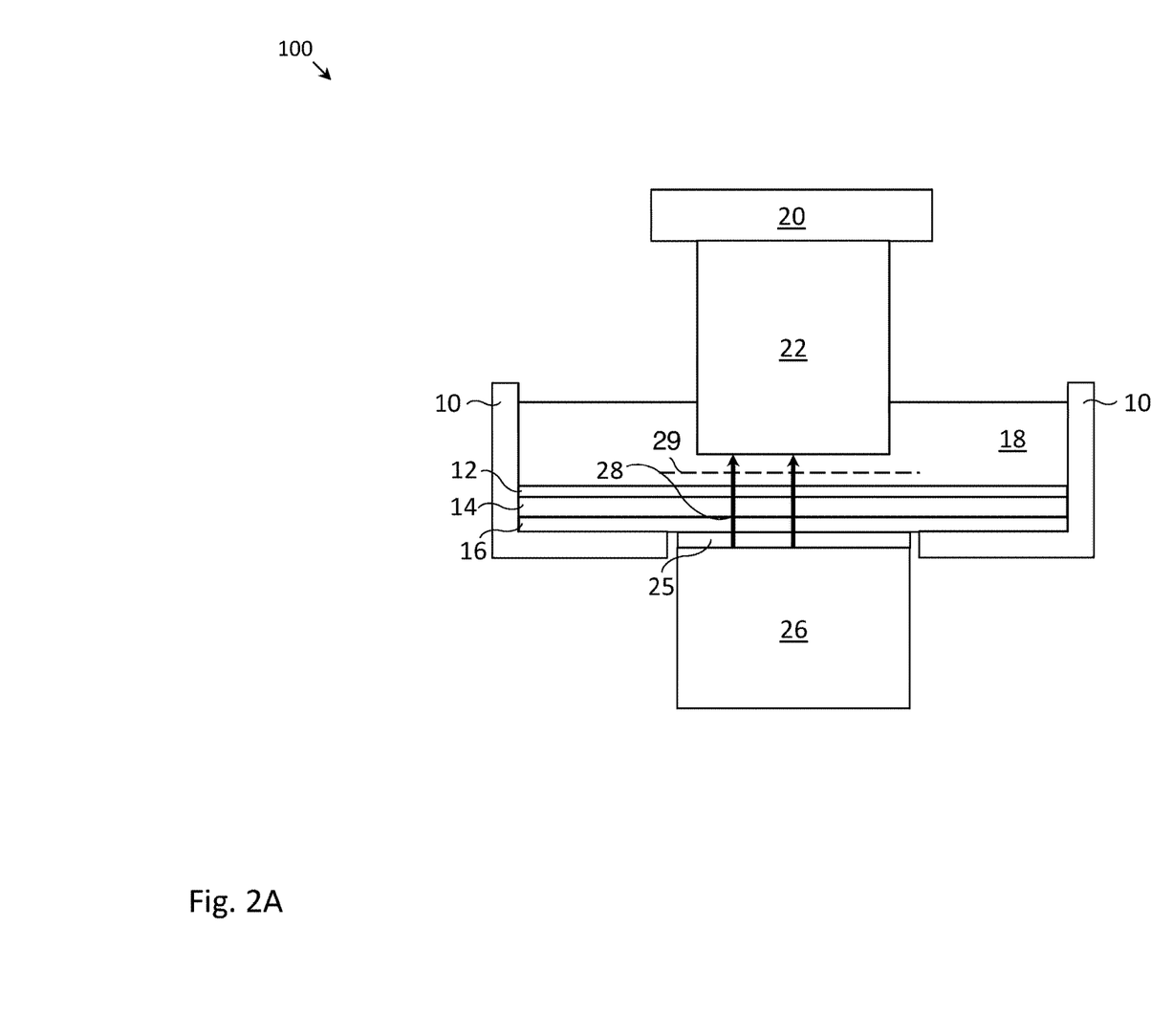
FIGS. 2A-2G illustrate steps that may be sequentially performed in the continuous or semi-continuous fabrication of layers or portions of layers of an object using 3D printing systems such as those illustrated in FIGS. 1A and 1B.

FIGS. 2A-2E illustrate steps that may be sequentially performed in the continuous or semi-continuous fabrication of layers or portions of layers of object 22 using 3D printing system 100. As shown in FIG. 2A, electromagnetic radiation 28 is emitted from light source 26 through mask 25 and tank opening 11 into tank 10. The electromagnetic radiation may form an image on image plane 29 in accordance with a projection on mask 25. Areas of high (or moderate) intensity within the image may cure localized regions of the photo-curing liquid polymer 18.

Figure 2B:
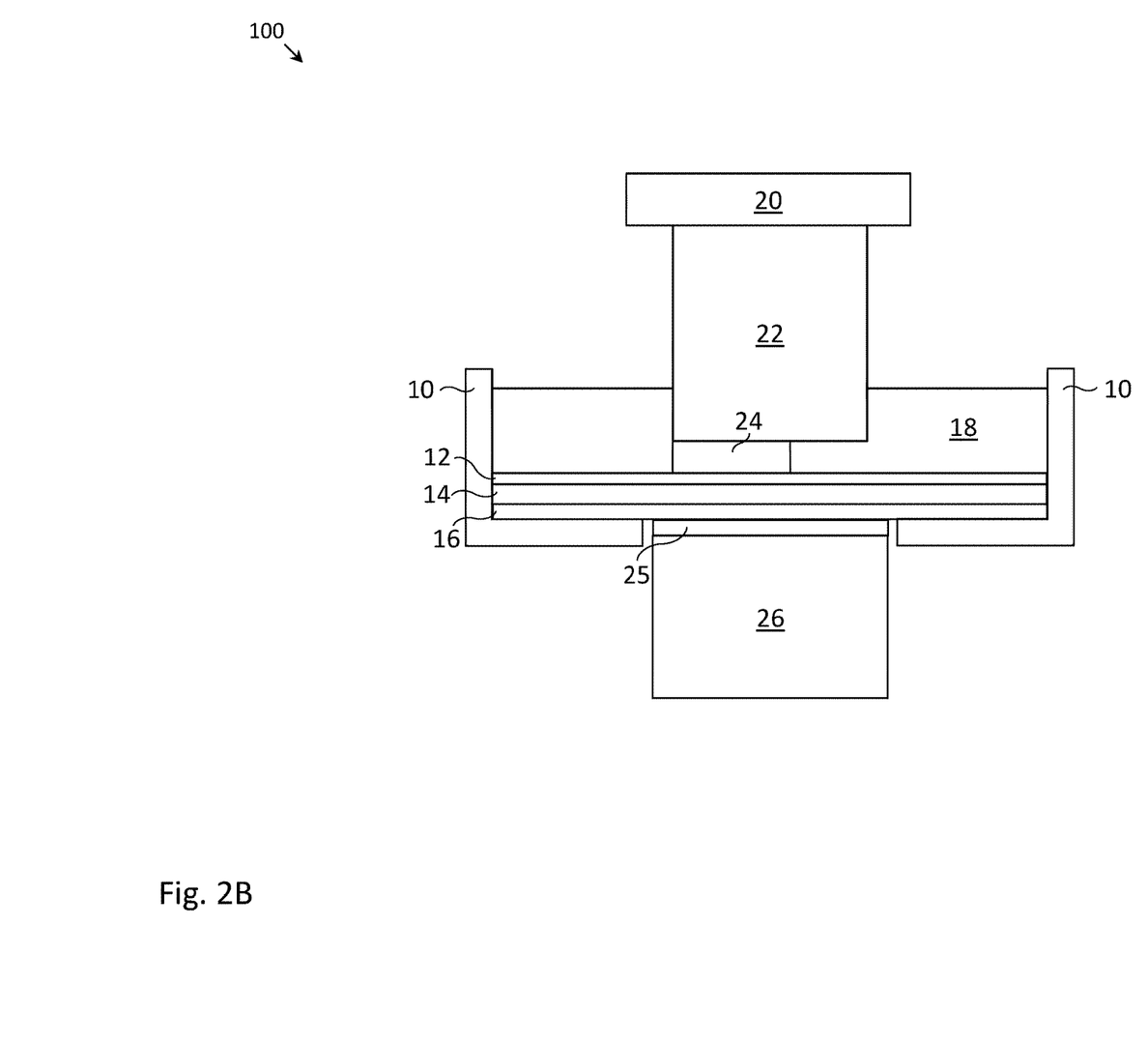

Next, as shown in FIG. 2B, cured layer 24 (which is a newly formed layer of object 22) has formed due to the curing of the photo-curing liquid polymer 18. Cured layer 24 adheres to the bottom surface of object 22, and substantially does not adhere to the bottom surface of tank 10, due to the presence of lubricant layer 12 and membrane 14. After cured layer 24 has been formed, the emission of electromagnetic radiation 28 may temporarily be suspended (as suggested by the absence of arrows 28 in FIG. 2B) either by discontinuing the emissions from light source 26 and/or by projecting an opaque image on mask 25.

Figure 2C:
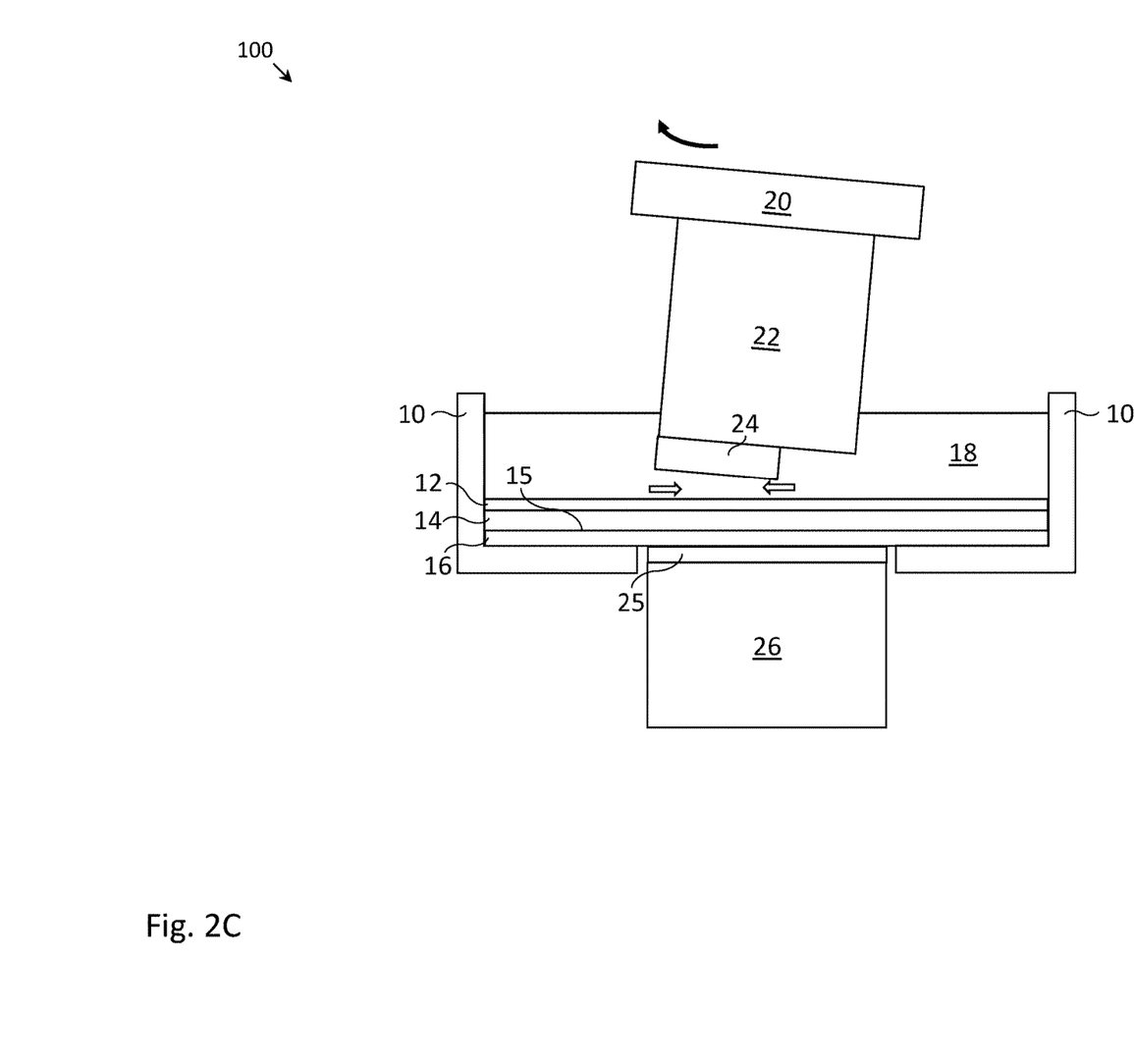
Figure 2D:
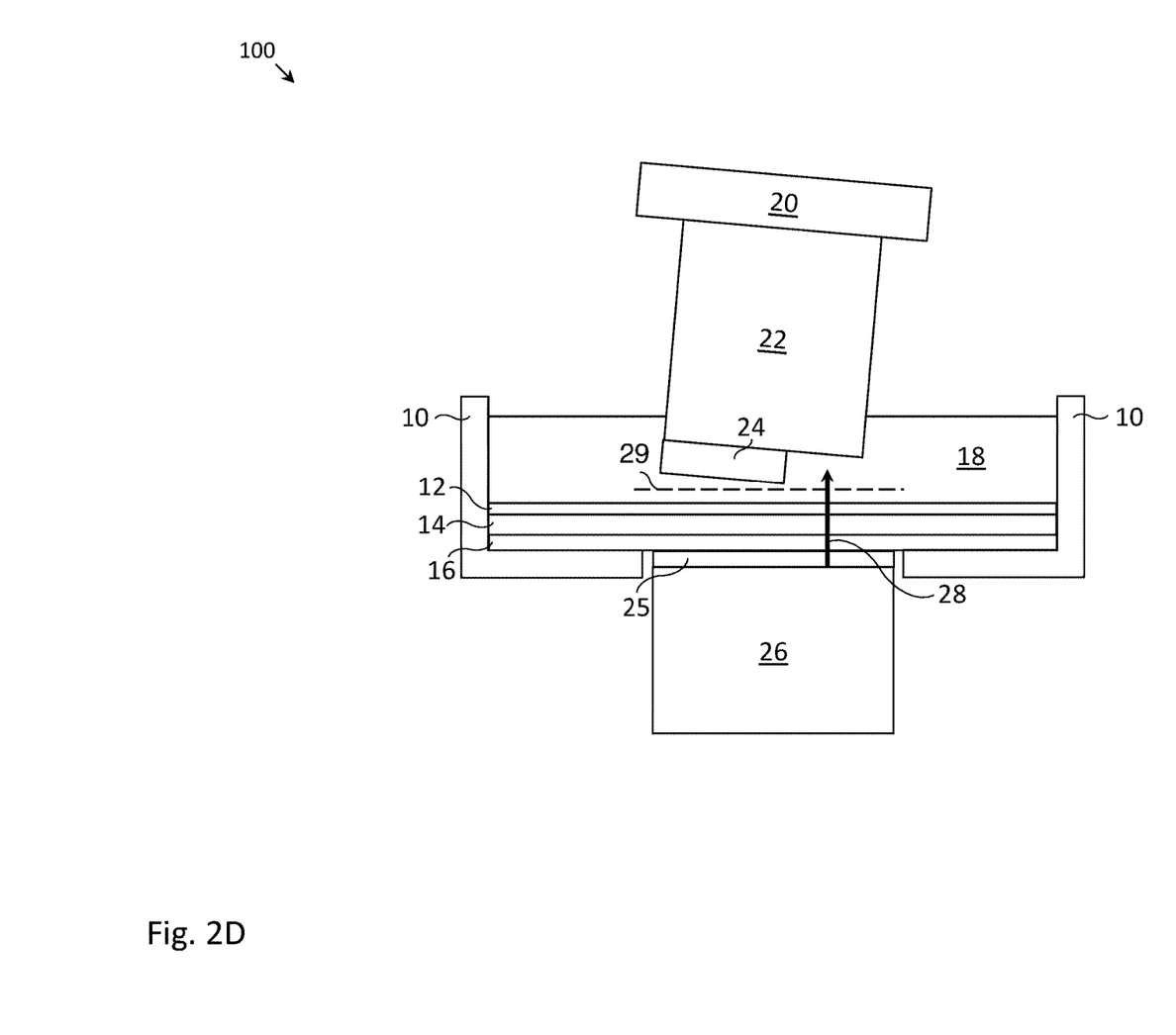

Next, as shown in FIG. 2C, object 22, complete with newly formed layer 24, may be positioned away from the backing member 16 (e.g., incrementally raised within tank 10) in preparation for a subsequent layer of photo-cured liquid polymer to be formed on the object. While raising object 22 within tank 10, photo-curing liquid polymer 18 may be drawn into the void generated by the raising of object 22, and such photo-curing liquid polymer 18 will allow for the formation of the next layer of object 22.

Unlike conventional 3D printing systems, where object 22 may be positioned away from the base of tank 10 by displacing extractor plate 20 in only a vertical direction (orthogonal to the plane of the tank base), in accordance with embodiments of the invention extractor plate 20 is displaced away from the base of the tank 10 in a tilting, swinging, rotating, and/or swirling fashion as depicted in FIG. 2C. In one embodiment of the invention, the motion may be a spiral or helical path away from backing member 16. Thus, as shown in the depicted example, photo-curing of the resin 18 may be confined to an area beneath a lowest portion of the extraction plate (in terms of its separation distance from backing member 16). Thus, only that portion of the object under construction 22 that corresponds to the general area of the lowest portion of extractor plate 20 is undergoing photo-curing at any one time. The remainder of the object under construction 22 is being translated away from the base of tank 10 and backing member 16, allowing photo-curing liquid polymer 18 to refresh the area of the tank 10 being vacated. The motion of the extractor plate 20 is maintained in this fashion continuously, or approximately so, so that the area of the object 22 under construction that is undergoing photo-curing follows an irregular, oval, circular, toroidal, or other shape within the tank 10, depending on the shape of the object under construction at a given time (i.e., the image being projected via mask 25).

Figure 4A:
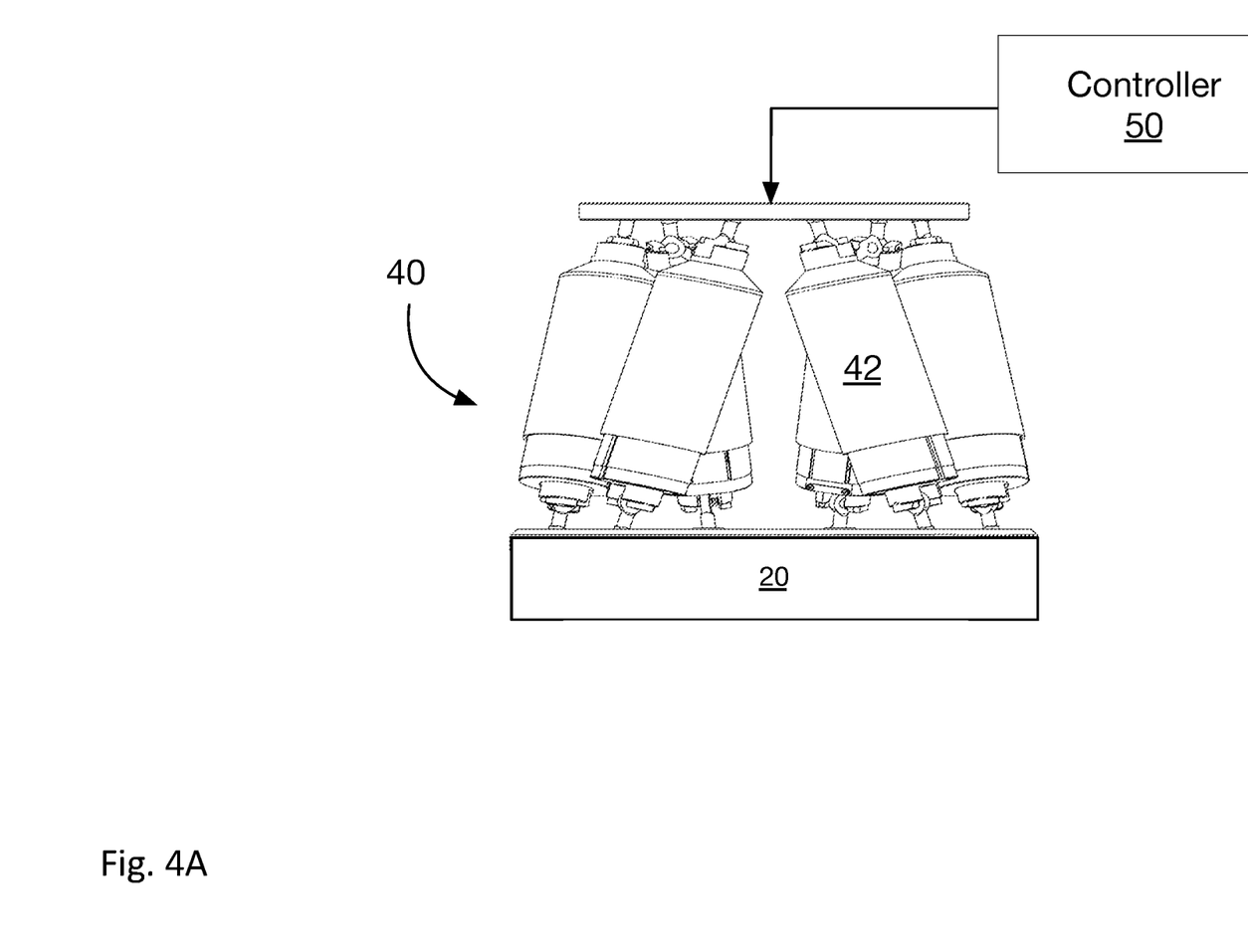
FIG. 4A depicts an example of an extractor plate coupled to a hexapod consisting of six actuators, each configured to control the motion of extractor plate in one plane under the direction of a controller.

The motion of the extractor plate 20 may be controlled, in one embodiment, using a hexapod. High-precision, multi-axis hexapods are known in the art and, generally, provide parallel kinematic motion in six degrees of freedom: translation in two dimensions of a plane, altitude, pitch, roll, and yaw. Each of these axes is associated with one or more actuators, to drive the hexapod in an associated direction. The actuators may be capable of very small motions, on the order of a few microns at a time, so that complex motions over very small distances may be achieved. Hexapod positioners are also known in the art as Stewart platforms. FIG. 4A shows an example of an extractor plate 20 coupled to a hexapod 40 consisting of six actuators 42, each configured to control the motion of extractor plate 20 in one plane under the direction of a controller 50.

Figure 4B:
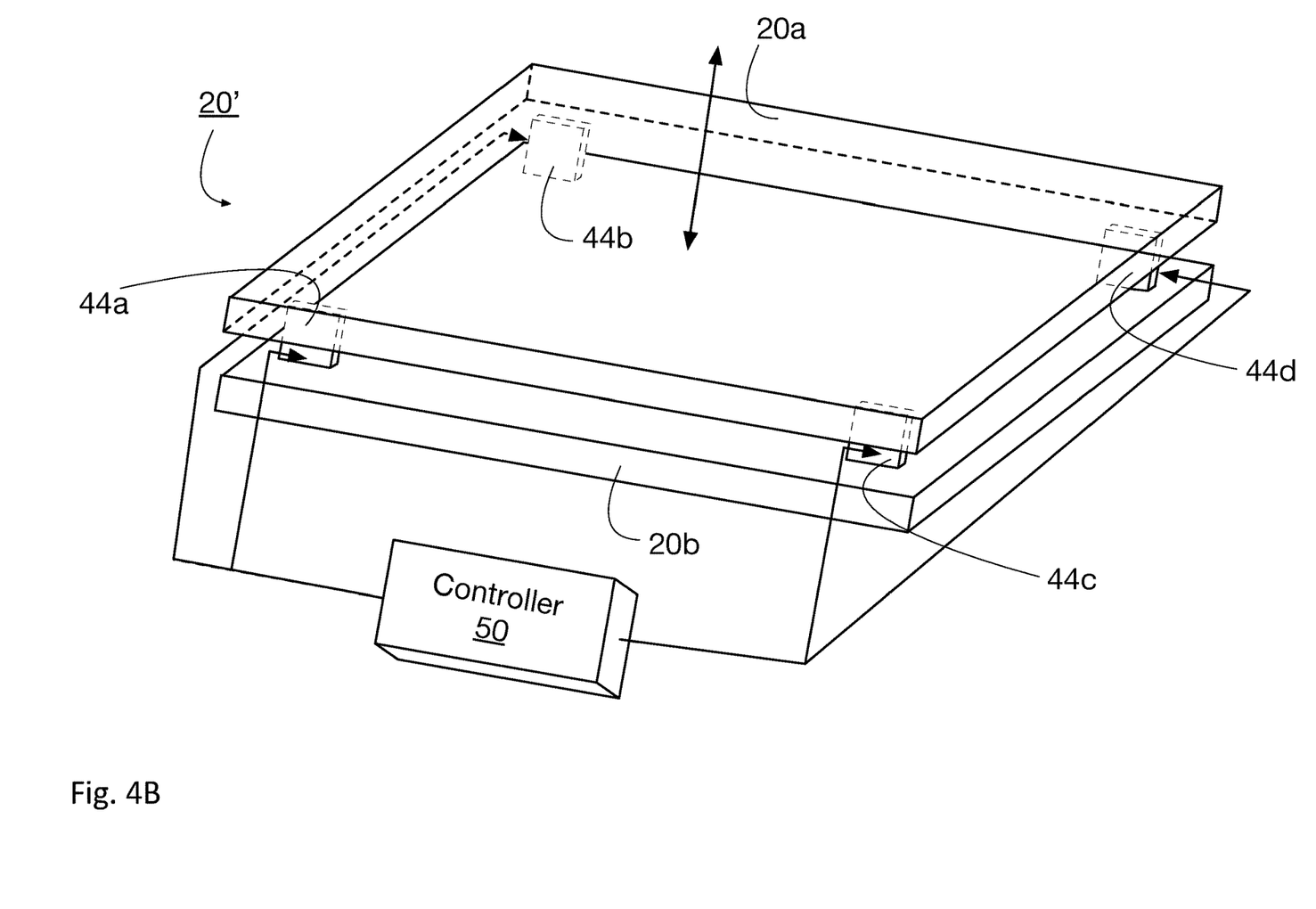
FIG. 4B depicts control of an extractor plate using a number of piezo actuators positioned at various locations in an extractor plate assembly.

Alternatively, as shown in FIG. 4B, the motion of extractor plate 20 may be controlled using a number of piezo actuators 44a-44d positioned at various locations in an extractor plate assembly 20'. The extractor plate assembly 20' includes two parallel plates 20a and 20b, separated from one another by a sufficient distance to accommodate the piezo actuators 44a-44d between them. The entire extractor plate assembly 20' is arranged to be translated vertically in an axis perpendicular to the plane of plates 20a and 20b as shown. For example, the upper plate 20a may be affixed to one or more pistons or other actuators (not shown) to allow for such movement under the control of controller 50. The piezo actuators 44a-44d are affixed to the upper plate 20a near the corners thereof, on a surface of plate 20a facing plate 20b, and to similar locations on a surface of plate 20b facing plate 20a. Under the control of controller 50, each of the piezo actuators 44a-44d may be operated so as to translate plate 20b with respect to plate 20a in either or both of two dimensions; that is, in the plane of the plates that make up the extractor plate assembly 20'. Thus, by controlling the position of plate 20a relative to the backing member 16 at the base of tank 10 via the pistons or other actuators, and the relative positions of plates 20a and 20b with respect to one another via the piezo actuators 44a-44d, the overall position of extractor plate assembly 20' with respect to backing member 16 may controlled in the same six dimensions as in the case of the embodiment using a hexapod. In some instances, the piezo actuators 44a-44d may be configured to adjust the relative positions of plates 20a and 20b with respect to one another both in the plane of the plates that make up the extractor plate assembly 20' and in a plane orthogonal thereto, thus avoiding the need to separately control pistons or other actuators in order to effect movement in the orthogonal plane. This may be useful in embodiments where high frequency movement in the orthogonal plane is desired.

Figure 2E:
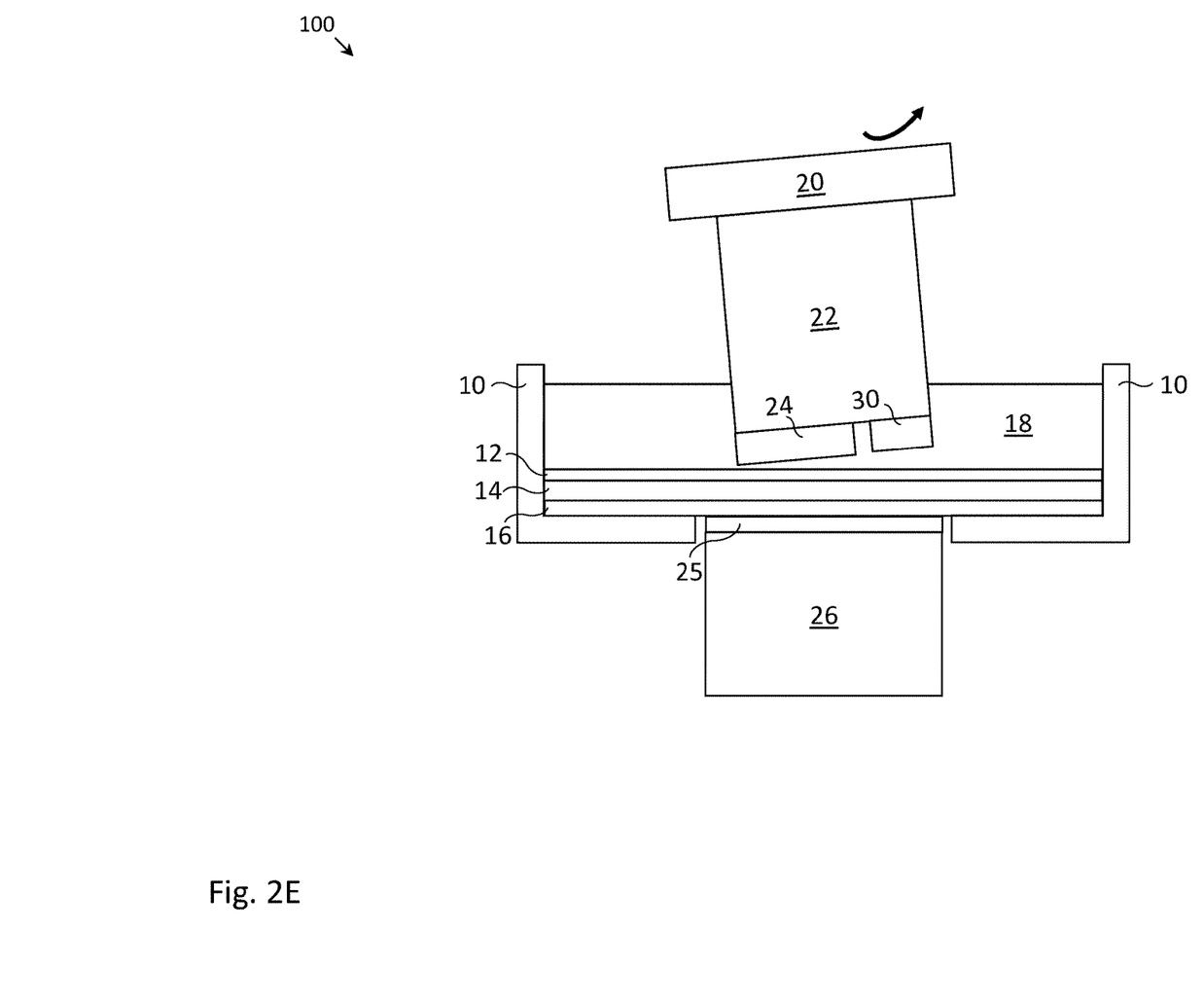
Figure 2F:
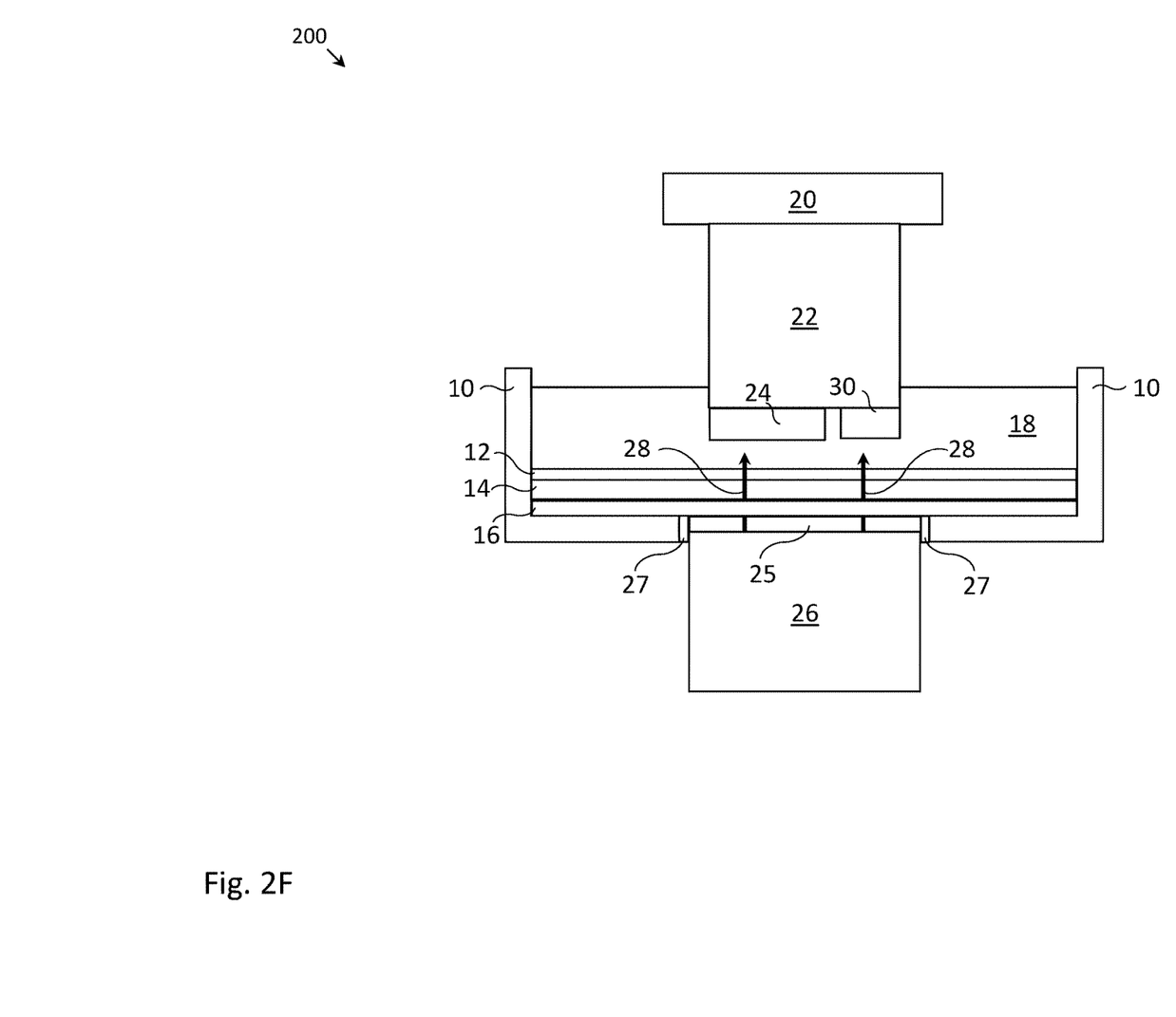
Figure 2G:
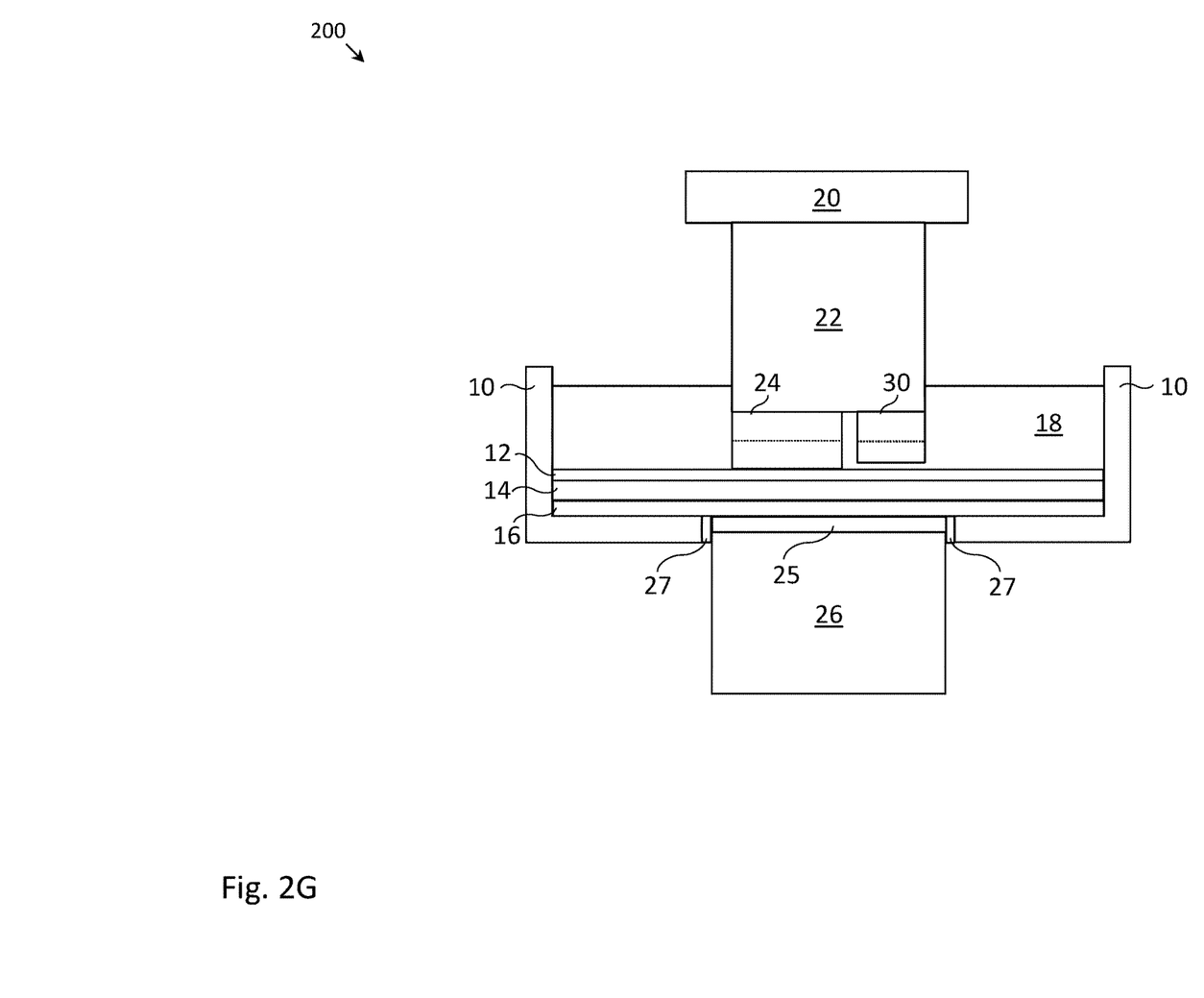
Figure 3:
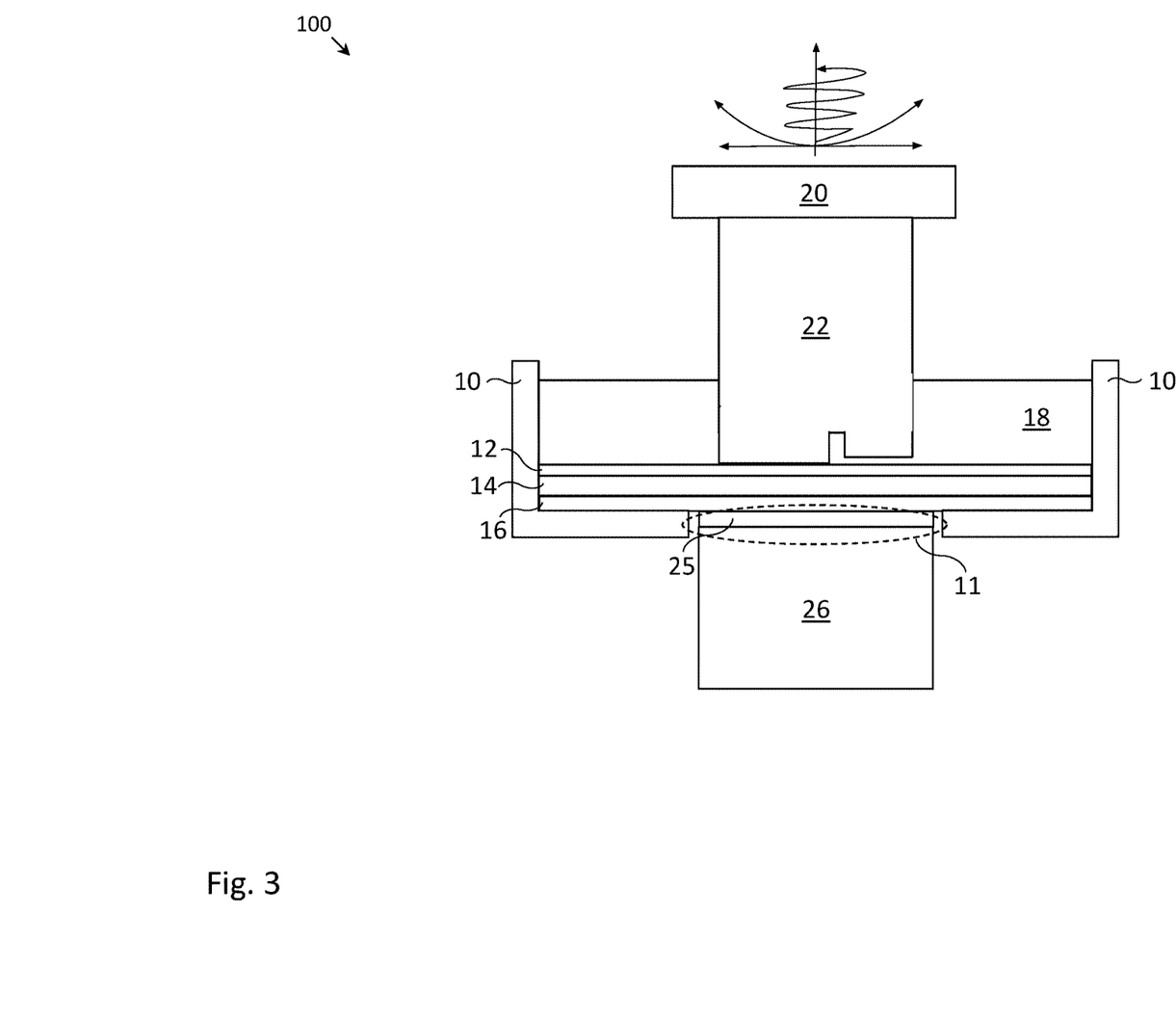
FIG. 3 shows an example of an extraction plate displaced from its position along tilting, swinging, rotating, and/or swirling paths.

Returning now to FIG. 2D, the printing process continues by exposing another area of the photo-curing liquid polymer 18 in the tank 10 to UV radiation in accordance with a pattern of an object to be created as projected via mask 25. As each portion 30 of the object is so printed, the extraction plate 20 is moved, as shown in FIG. 2E, from its current position in that area, in a tilting, swinging, rotating, and/or swirling, in one embodiment a spiral or helical, fashion overall, and printing proceeds then to yet a further area of the object by illuminating a corresponding area of the polymer resin in the tank with the UV radiation. As shown in FIGS. 2F and 2G, the area being illuminated is maintained so as to correspond with a currently lowest area of the extraction plate 20. That is, the area of the extraction plate that is currently closest to the tank base. This area of the extraction plate is maintained at a distance from the tank base that is sufficiently spaced away therefrom to allow for curing of the polymer resin in order to form the portion of interest of the object under construction. As each such area is printed, the extraction plate is displaced from its position along the tilting, swinging, rotating, and/or swirling path as illustrated in FIG. 3.

Because the tilting, swinging, rotating, and/or swirling movement of the extraction plate allows for continuous, or nearly so, refreshing of polymer resin to an area where printing of a portion of a layer of an object under construction has just concluded, less time is lost to the process of repositioning the extraction plate and awaiting such refresh between printing of successive layers than is the case with conventional 3D printers of the SLA or DLP type. Moreover, less stress is placed on each newly-formed layer, or portion thereof, during that process because of the use of a flexible membrane, as described above.

Figure 5:
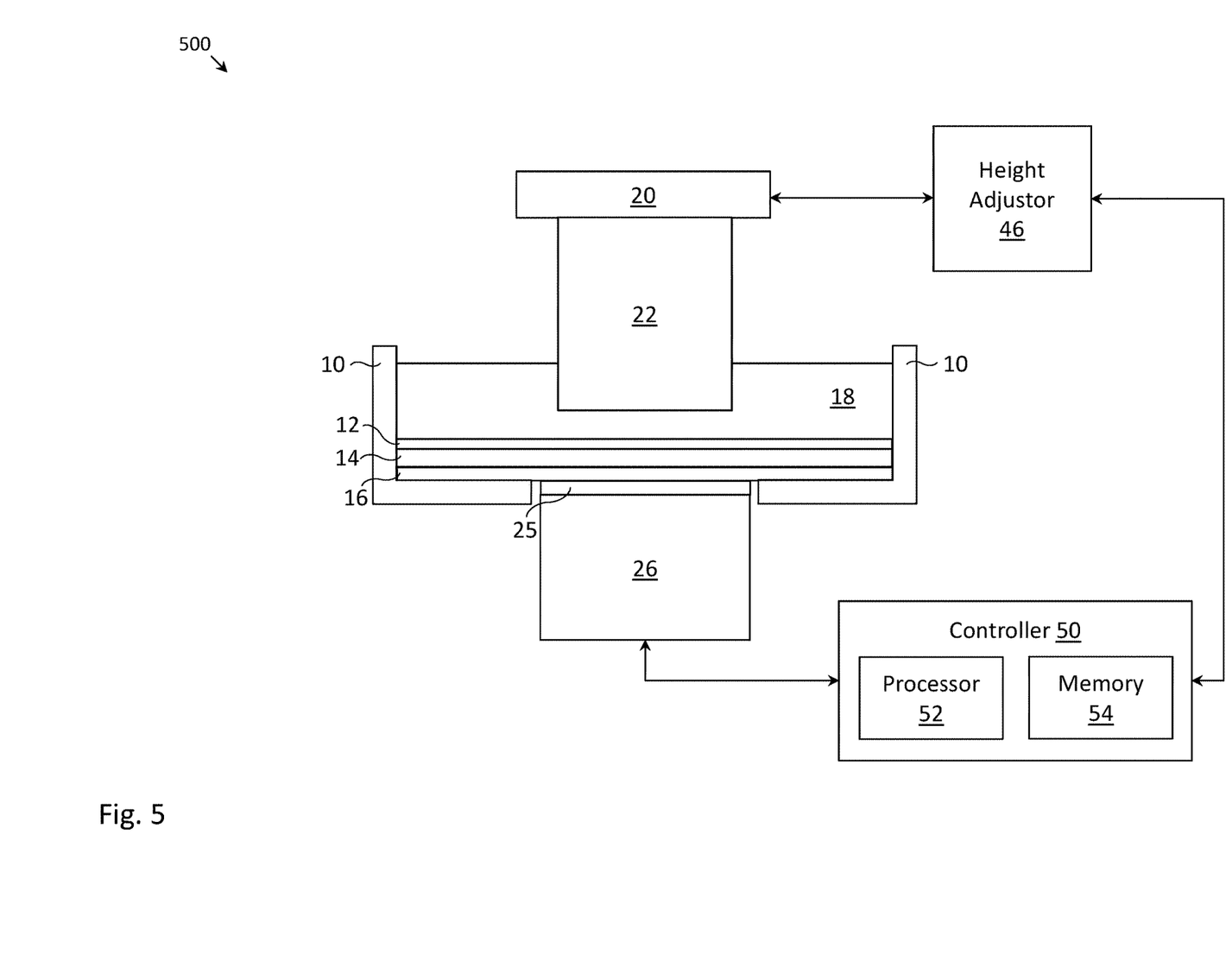
FIG. 5 depicts a controller communicatively coupled to a height adjustor, light source and mask, in accordance with one embodiment of the invention.

Referring now to FIG. 5, height adjustor 46 (e.g., which may be a hexapod or a plurality of piezo actuators, as discussed above, or another height adjustment means) is coupled to the extractor plate 20 and is operated by controller 50 of 3D printing system 500. As explained above, height adjustor 46 may adjust the position of extractor plate 20 with respect to backing member 16 in a tilting, swinging, rotating, and/or swirling path. Such adjustment may be performed as part of the printing process; e.g., raising a portion object 22 to replenish a layer of photo-curing liquid polymer 18 below the bottom surface of object 22.

Controller 50 may also control light source 26 (e.g., controlling an intensity of light source 26), and mask 25 (e.g., controlling which regions of the mask pass light, which regions block light). Controller 50 may include a processor 52 and memory 54, the memory 54 including instructions that, when executed by processor 52, cause the controller 50 to perform the above-described actions of the controller to operate the light source, mask and height adjustor.

Figure 6:
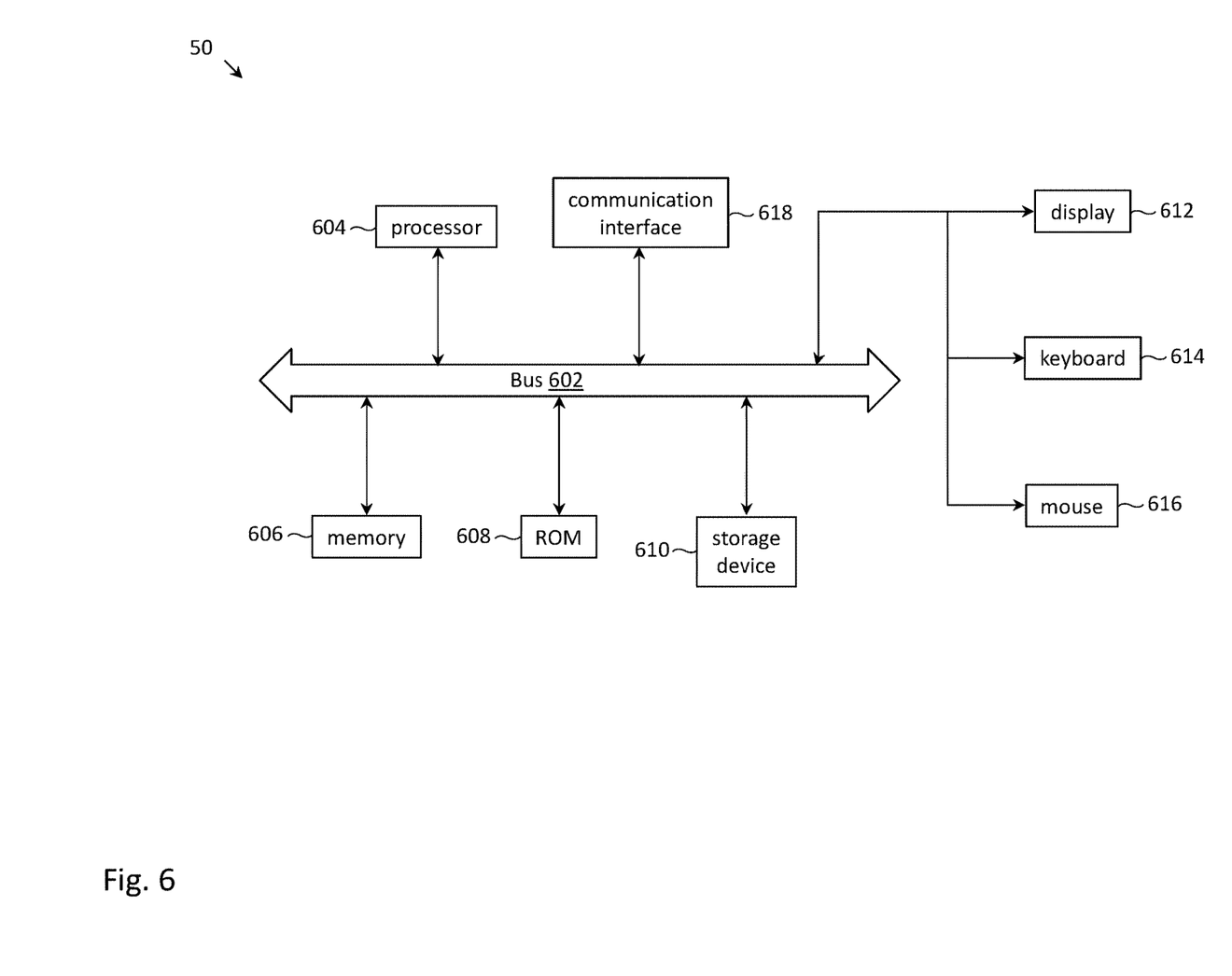
FIG. 6 depicts components of a computer system in which computer readable instructions instantiating the methods of the present invention may be stored and executed.

As shown in FIG. 6, controller 50 may be a processor-based controller programmed to control the printing operations of the apparatus for forming three-dimensional objects. Note that not all of the components of controller 50 have necessarily been illustrated. Moreover, in some embodiments the controller 50 may not include a display or separate interface components such as a keyboard and mouse inasmuch as such facilities may be provided by a remote computer communicatively coupled to the controller over a wired or wireless network connection.

In general, controller 50 includes a bus 602 or other communication mechanism for communicating information, and one or more processors 604 coupled with the bus 602 for processing information and instructions, and effecting control of the printing apparatus in accordance therewith. Controller 50 also includes a main memory 606, such as a random-access memory (RAM) or another dynamic storage device, coupled to the bus 602 for storing information and instructions to be executed by processor(s) 604. Main memory 606 also may be used for storing temporary variables or other intermediate information during execution of instructions to be executed by processor(s) 604.

Controller 50 also may include a read only memory (ROM) 608 and/or other static storage device 610 (e.g., a flash memory-based storage medium) coupled to the bus 602 for storing static information and instructions for the processor(s) 604 (e.g., operating systems, applications programs, and the like). As mentioned above, the controller may, but need not, include a display 612 for displaying information to a user, and one or more input devices such as a keyboard 614 or mouse 616, for communicating information and command selections to the processor 604. A communications/network interface 618 coupled to bus 602 may include a network adapter (e.g., Ethernet card), cellular radio, Bluetooth radio, NFC radio, Wi-Fi transceiver, etc. used for communicating data and/or instructions over various networks, such as a telecommunications network or LAN.

The processes referred to herein may be implemented by processor(s) 604 executing appropriate sequences of computer-readable instructions contained in main memory 606. Such instructions may be read into main memory 606 from another computer-readable medium, such as storage device 610, and the execution of the sequences of instructions contained in the main memory 606 causes the processor(s) 604 to perform the associated actions. In alternative embodiments, hard-wired circuitry or firmware-controlled processing units (e.g., field programmable gate arrays) may be used in place of or in combination with processor(s) 604 and its associated computer software instructions to implement embodiments of the invention. The computer-readable instructions may be rendered in any computer language.

Thus, 3D printing by means of photo-curing photo-sensitive materials for the formation of three-dimensional objects in a tank, wherein a supporting plate moves progressively, in some cases continuously, away from said transparent base during the printing process in a tilting, swinging, rotating, and/or swirling path has been described.

What is claimed is:

1. An apparatus for forming three-dimensional objects by photo-curing a photo-curing liquid polymer through exposure to a radiation, said apparatus including a tank for collecting said photo-curing liquid polymer, a base of the tank being transparent to said radiation, a supporting plate configured to support an object being formed, and a controller that includes a processor and memory, the memory storing instructions that when executed by the processor, cause the supporting plate to continuously move away in a helical manner from said transparent base during photo-curing of said photo-curing liquid polymer.

2. The apparatus of claim 1, wherein the controller is configured to control said supporting plate to continuously move away from the transparent base of the tank such that a motion of said supporting plate varies in amplitude along one or more axes.

3. The apparatus of claim 1, wherein the controller is configured to control said supporting plate to continuously move away from the transparent base of the tank such that a motion of said supporting plate varies in frequency along one or more axes.

4. The apparatus of claim 1, further comprising a hexapod, wherein the supporting plate is affixed to the hexapod, and wherein the controller is configured to control a movement of the hexapod, which in turn controls a movement of the supporting plate.

5. The apparatus of claim 1, further comprising a plurality of piezo actuators, wherein the supporting plate is affixed to the plurality of piezo actuators, and wherein the controller is configured to control a movement of the plurality of piezo actuators, which in turn controls a movement of the supporting plate.

* * * * *